Aug. 13, 1940.                K. U. MacIVOR                2,211,379
                                  RAKE
                         Filed Sept. 1, 1938        2 Sheets-Sheet 1
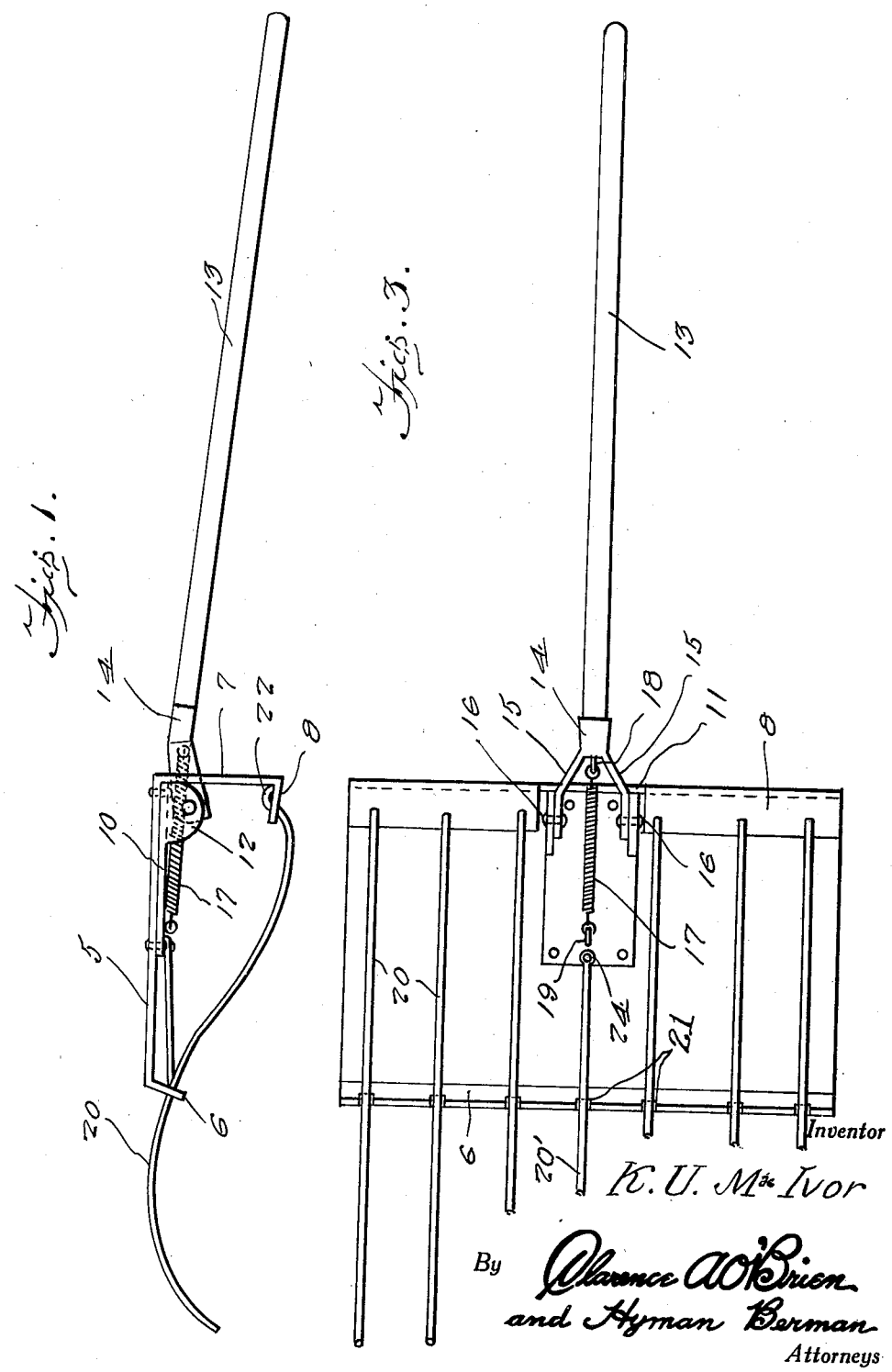
Inventor
K. U. McIvor
By Clarence A. O'Brien
and Hyman Berman
Attorneys

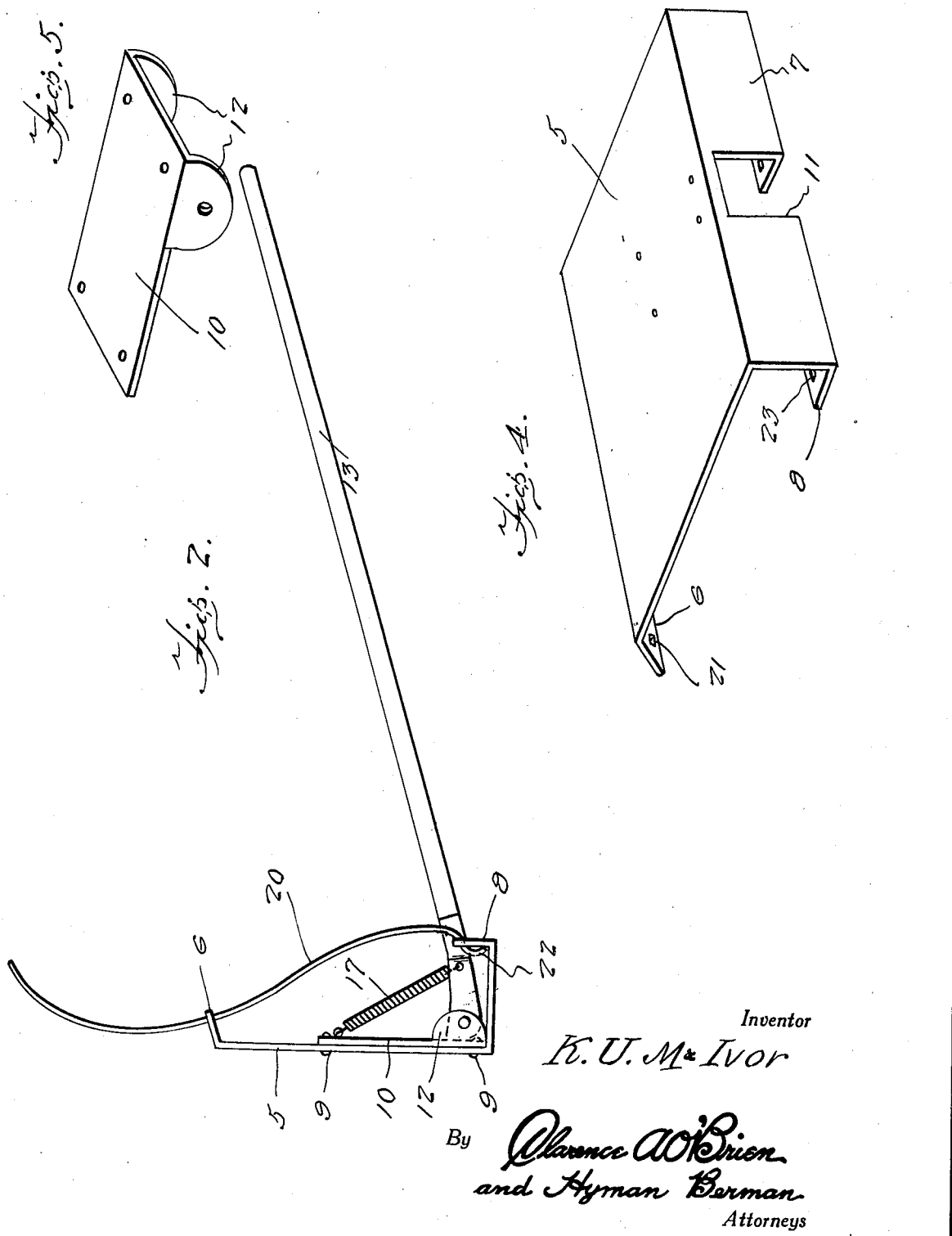

Patented Aug. 13, 1940

2,211,379

UNITED STATES PATENT OFFICE 2,211,379

RAKE

Kenneth U. MacIvor, Bryn Mawr, Pa.

Application September 1, 1938, Serial No. 228,023

2 Claims. (Cl. 56—400.04)

This invention relates to rakes and particularly to rakes designed primarily for use in raking leaves and trash accumulating on the surfaces of lawns and the like.

An object of the present invention is to provide a rake which may be used with facility either in drawing the leaves toward the user, or pushing the leaves away from, or in advance of the user; and the invention together with its objects and advantages will be best understood from a study of the following description taken in connection with the accompanying drawings wherein:

Figure 1 is a side elevational view of a rake embodying the features of the present invention and showing the rake in the position occupied when used for drawing the materials toward the user.

Figure 2 is a view similar to Figure 1 showing the position of the rake when using the latter for pushing the materials away from, or in advance of the user.

Figure 3 is an inverted plan view of Figure 1 with some of the teeth broken away.

Figure 4 is a perspective view of a plate forming the head portion of the rake, and Figure 5 is a perspective view of a handle-attaching plate.

Referring to the drawings by reference numerals it will be seen that in accordance with the present invention the rake comprises a head 5 in the form of a substantially rectangular metallic, plate-like body part having an obtuse angled front edge flange 6 and a rear edge flange 7 disposed substantially at right angles to said body part. The flange 7 is provided with an inwardly directed integral lip 8 as shown.

Riveted or otherwise secured as at 9 to one face of the plate 5 and adjacent the flanged end 7 of the plate is a relatively smaller handle-attaching plate 10. The plate 10 is arranged substantially in alignment with a notch 11 provided in the flange 7 and its lip 8, and adjacent one end thereof the handle-attaching plate 10 is provided at opposite longitudinal edges with apertured ears 12.

A handle 13 is provided for the head 5 to one end of which is secured a fork 14, the legs 15 of which are accommodated by the notch 11 and are pivoted to the ears 12 by rivets or other suitable elements 16, the arrangement being such that said head 5 is swingable about an axis transverse to the handle 13. Thus, it will be seen, that the head 5 is connected to the handle 13 in a manner to be swung downwardly thereof either into a position in which the body part extends forwardly at a slightly downward angle relative to the handle 13, or, to be swung upwardly of the handle 13 into a position in which said body part is substantially at a right angle to the first mentioned position. The first mentioned position is best shown in Figure 1, and the second mentioned position in Figure 2.

A coil spring 17 is anchored at one end to the fork 14, as at 18, and at its opposite end to the plate 10 as at 19, the arrangement being such that when the head 5 is swung into the first mentioned position, said spring 17 is on one side of the pivotal axis of said head, whereas, when the head is swung into the second mentioned position, the spring 17 is on the other side of said axis, whereby said spring yieldingly holds said head 5 against movement from either position.

Tines 20 of the shape shown and formed of flat steel spring material have intermediate portions thereof trained through openings 21 provided therefor in the flange 6 while at one end thereof the tines 20 are provided with hook-shaped terminals 22 which are trained through openings 23 provided in the flange-lip 8 and engaged with the lip 8 as shown, said tines 20 having the other ends thereof extending beyond the front edge of the body part of the head 5. Thus it will be seen that the tines are suitably secured to the head 5, it being further noted that the intermediate tine indicated by the reference numeral 20' is anchored at its inner end to the head 5 through the medium of a rivet, or other suitable fastening element 24 as shown in Figure 3.

When the rake is to be used in a conventional manner, that is, in a manner for drawing the leaves, trash, loose grass, and the like over the surface of the lawn toward the operator, or user, the head 5 is swung into the first mentioned position relative to the handle 13 in which, as shown in Figure 1, the tine equipped side of the head faces downwardly so that the tines 20, 21, may be used in the usual manner.

When it is desired to use the rake somewhat in a manner to push the leaves, or trash, away from or forwardly of the user, the head 5 is swung into the second mentioned position, shown in Figure 2, in which position, as will be seen, the head 5 is disposed so that the flange 7 may be imposed flat on the ground for use as a shoe, and the rest of the plate-like body part is disposed in upstanding position relative to the ground to present a broad pusher plate surface at a right angle to the ground.

It will be apparent that little effort will be required of the user to change the relative position of the handle 13 and head 5 and thus convert the rake from one form, or type to another form, or type, or in other words to convert the rake from the form shown in Figure 1 to the form shown in Figure 2 and vice versa, dependent upon the manner in which the rake is to be used.

It also will be appreciated that the tines 20, 20' are so secured to the head 5 as to be relatively rigidly associated therewith and to be so secured thereto as to insure against the tines working loose or rattling.

It is thought that a clear understanding of the construction, utility and advantages of a rake embodying the features of the present invention will be had without a more detailed description.

Having thus described the invention what is claimed as new is:

1. A rake comprising a handle, a head including a plate-like body part having a rear edge flange disposed at a right angle to said body part, tines secured to said flange and extending beyond the front edge of the body part, and a pivotal connection between one end of the handle and the rear edge portion of said body part whereby said head is swingable about an axis transverse to the handle into either of two positions which are substantially at right angles to each other, said head in one position thereof positioning the tines to extend forwardly of the handle and in the other position thereof positioning said flange to rest flat upon the ground for use as a shoe whereby the body part presents a broad pusher-like surface at a right angle to the ground.

2. A rake comprising a handle, a head including a plate-like body part having a rear edge flange disposed at a right angle to said body part, tines secured to said flange and extending beyond the front edge of the body part, and a pivotal connection between one end of the handle and the rear edge portion of said body part whereby said head is swingable about an axis transverse to the handle into either of two positions which are substantially at right angles to each other, said head in one positoin thereof positioning the tines to extend forwardly of the handle and in the other position thereof positioning said flange to rest flat upon the ground for use as a shoe whereby the body part presents a broad pusher-like surface at a right angle to the ground, and a coil spring having its opposite ends connected to said body part and handle, respectively, said spring being constructed and arranged to swing to one side of said axis in one position of the head and to the other side of said axis in the other position of said head, whereby said spring yieldingly holds said head against movement from either position.

KENNETH U. MacIVOR.